United States Patent
Carrell et al.

(10) Patent No.: US 6,237,572 B1
(45) Date of Patent: May 29, 2001

(54) APPARATUS AND METHOD FOR DETERMINING START OF INJECTION OF A FUEL INJECTOR

(75) Inventors: Darwin R. Carrell, Edwards; Joshua C. Ruedin, Peoria, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/218,195

(22) Filed: Dec. 22, 1998

(51) Int. Cl.⁷ .................................................. F02M 37/04
(52) U.S. Cl. ......................... 123/501; 123/446; 123/357; 73/119.9
(58) Field of Search ................................. 123/501, 500, 123/494, 357, 446; 73/119 A (56) References Cited

U.S. PATENT DOCUMENTS

| | | | |
|---|---|---|---|
| 4,476,832 | * 10/1984 | Fujimori | 123/357 |
| 4,494,507 | * 1/1985 | Yasuhara | 123/357 |
| 4,503,820 | * 3/1985 | Nakagawa | 123/357 |
| 4,594,979 | * 6/1986 | Yasuhara | 123/357 |
| 4,678,160 | 7/1987 | Yamada et al. . | |
| 4,790,277 | * 12/1988 | Schechter | 123/357 |
| 4,825,369 | * 4/1989 | Oshizawa | 123/357 |
| 4,915,072 | * 4/1990 | Caron | 123/357 |
| 5,181,494 | 1/1993 | Ausman et al. | 123/446 |
| 5,231,962 | 8/1993 | Osuka et al. . | |
| 5,297,523 | 3/1994 | Hafner et al. | 123/456 |
| 5,311,903 | 5/1994 | Poulin . | |
| 5,357,912 | 10/1994 | Barnes et al. | 123/357 |
| 5,411,003 | 5/1995 | Eberhard et al. | 123/502 |
| 5,423,302 | 6/1995 | Glassey | 123/446 |
| 5,445,129 | 8/1995 | Barnes | 123/446 |
| 5,586,538 | 12/1996 | Barnes | 123/446 |
| 5,673,669 | 10/1997 | Maley et al. | 123/446 |
| 5,678,521 | 10/1997 | Thompson et al. . | |
| 5,722,373 | * 3/1998 | Paul | 123/357 |
| 5,738,071 | * 4/1998 | Smith | 123/357 |
| 5,771,861 | * 6/1998 | Musser | 123/357 |
| 5,848,581 | * 12/1998 | Hirose | 123/357 |
| 5,941,210 | 8/1999 | Hill et al. . | |

FOREIGN PATENT DOCUMENTS

| | | |
|---|---|---|
| 559 136 A2 | 3/1993 | (EP) . |
| 862 684 | 10/1957 | (GB) . |
| 2 320 522 | 6/1998 | (GB) . |

* cited by examiner

*Primary Examiner*—Carl S. Miller
(74) *Attorney, Agent, or Firm*—W. Bryan McPherson, III (57) ABSTRACT

The present invention provides a method and apparatus for determining a fuel injection delay of a fuel injector located within an engine, during the operation of the engine. The fuel injector includes a solenoid that is electrically connected to a controller. The invention includes the steps of generating an injection command signal, determining a time of said injection command signal generation, and sensing a start of injection. The start of injection is dynamically sensed during the operation of the engine.

3 Claims, 7 Drawing Sheets

Fig-1-

Fig_6

Fig. 7.

APPARATUS AND METHOD FOR DETERMINING START OF INJECTION OF A FUEL INJECTOR

TECHNICAL FIELD

This invention relates generally to a fuel system, and more particularly, to a method and apparatus for determining an injection delay of fuel within a fuel system.

BACKGROUND ART

In a fuel system having hydraulically-actuated electronically controlled unit injectors is (HEUI), high pressure hydraulic actuating fluid is used to control fuel flow. The hydraulic fluid used is usually the engine oil. The hydraulic fluid is supplied to an injector from a pump. The hydraulic fluid flows into a chamber, located within the injector, and pushes down on a plunger which pushes fuel out from a plunger cavity, and out the injector through a nozzle. A solenoid, located within the injector, controls when the high pressure actuating fluid is exposed to the plunger by moving a poppet valve. The amount of fuel injected is controlled by adjusting the duration the solenoid is on.

The viscosity of the actuating fluid effects both the amount of fuel delivered by the injector, and when the delivery process begins. For example, in cold temperatures the actuating fluid is thicker (more viscous) than at warm temperatures. Therefore, when an electrical signal is delivered to a solenoid, commanding the solenoid to deliver actuating fluid to the injector, the fluid flows at a slower rate into the chamber to push against the plunger. With the actuating fluid moving at a slower rate there is an increased delay before the injector begins delivering fuel. Furthermore, when the solenoid is again turned off to stop delivery of the fuel, the reduced flow rate of the actuating fluid results in less total fuel being injected between when the solenoid is turned on and off. Hence, with a high viscous actuating fluid seen at cold starting temperatures as compared to higher temperature operating conditions, an inaccurate amount of fuel is delivered by the injectors and then starting/stopping, or "injection" fuel delivery shifts. Under these conditions, overall engine performance is adversely effected, resulting in incomplete combustion, low power, white smoke, etc.

The viscosity of the actuating fluid is a function of the fluid type and the temperature of the fluid. In an operating engine, neither the type of fluid, nor the temperature is fixed. The fuel system may use a variety of actuation fluids. For example, a more viscous 15W40 engine oil or a less viscous 0W20 engine oil may be used. Also the fuel system operates over a wide range of temperatures, e.g., −50 degrees Fahrenheit through 250 degrees Fahrenheit.

The reduction in fuel delivery and delays in timing increase as the viscosity of the actuating fluid increases. If the changes in viscosity are not accounted for, the fuel delivery and timing may be incorrect making it difficult to start and run the engine especially at high viscosities encountered at cold temperatures. If the fuel delivery is too small the engine may not start or be underpowered. If the fuel delivery is too large the engine structural capabilities may be exceeded, or excessive smoke produced and misfire may occur.

The present invention is directed to overcoming one or more of the problems identified above.

DISCLOSURE OF THE INVENTION

In one aspect of the present invention, a method for determining a fuel injection delay of a fuel injector located within an engine is provided. The method includes the steps of generating an injection command signal and sensing a start of injection.

In another aspect of the present invention, a method for determining a start of injection of a fuel injector located within an engine is provided. The method includes the steps of sensing a position of the needle check, and determining the start of injection.

In yet another aspect of the present invention, an apparatus adapted to determine a fuel injection delay of a fuel injector located within an engine, is provided. The apparatus includes a sensing device located within the injector and a controller adapted to responsively determine a start of injection.

BEST MODE FOR CARRYING OUT THE INVENTION

Figure 1:
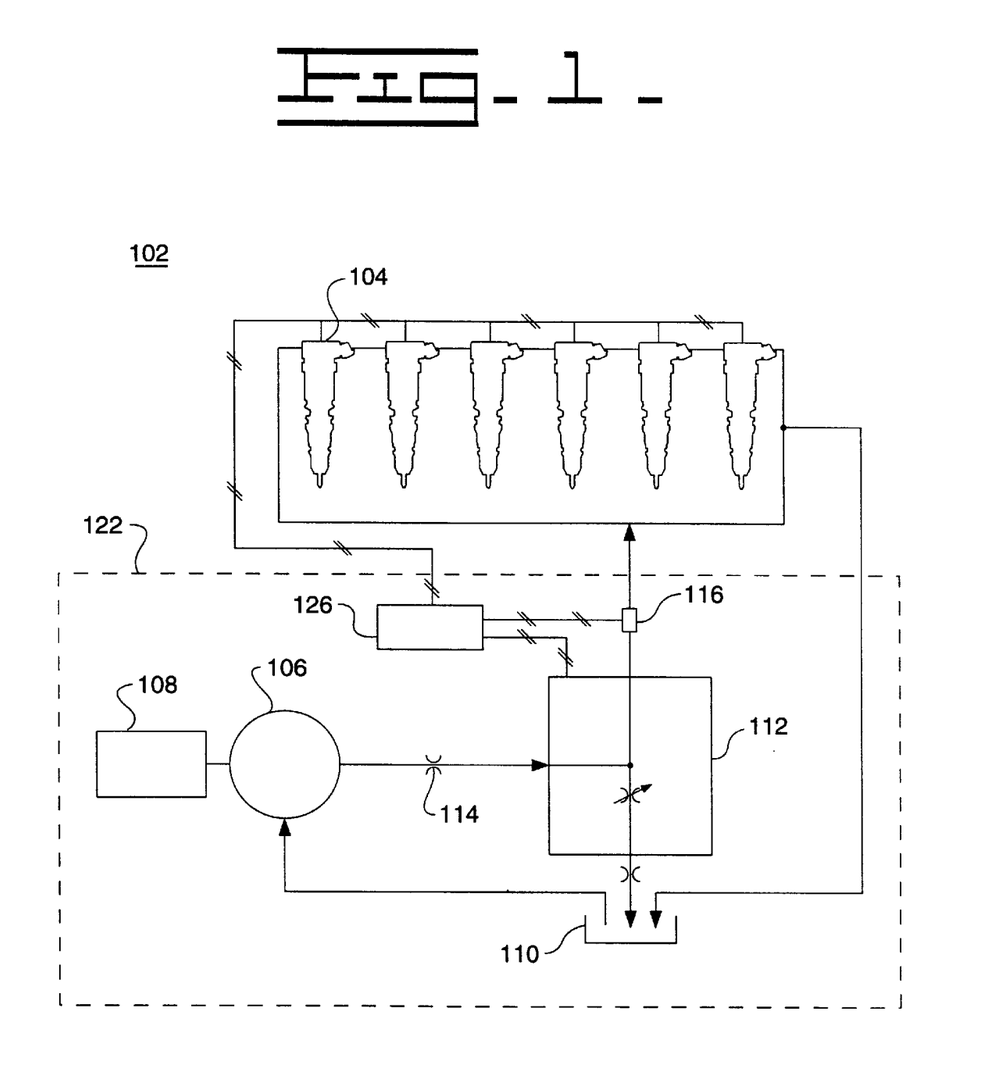
FIG. 1 is a high level diagram of one embodiment of an fuel system.

The present invention provides an apparatus and method for determining a fuel injection delay of a fuel injector. FIG. 1 is an illustration of one embodiment of a fuel system 102 of an engine. The fuel system 102 includes at least one fuel injector 104 for each combustion chamber or cylinder (not shown) of the fuel system 102. In the preferred embodiment, the fuel injectors are hydraulically actuated electronically controlled unit injectors (HEUI). However, a conventional fuel injector that is associated with a common rail fuel system is equally applicable. The fuel system 102 also includes a circuit 122 for supplying hydraulically-actuating fluid to each injector 104. In one embodiment the circuit 122 includes a pump 106, driven by an internal combustion engine 108. The output of the pump 106 is connected to each fuel injector 104 and also to a fluid sump (or tank) 110. The fluid sump 110 is also attached, through a return line, back to the pump 106. Each injector 104 is also connected to the fluid sump 110 in order to return the actuating fluid to the sump 110.

In the preferred embodiment, the actuating fluid used in the fuel system 102 may be a petroleum based oil, e.g., engine oil. However, other alternatives include synthetic oils and fuel may be used for the actuating fluid.

The circuit 122 includes an controller 126. The controller 126 contains software decision logic and information defining fuel system operational parameters and controls components within the fuel system 122. Multiple sensor signals, indicative of various engine parameters are delivered to the controller 126 to identify the engine's current operating condition. The controller 126 uses these input signals to control the operation of the fuel system 102 including the fuel injection quantity, injection timing, injection duration, and actuating fluid pressure. The controller 126 is electrically connected to a solenoid associated with each injector 104.

The circuit 122 includes a pressure control valve 112 for regulating how much actuating fluid flows to the injectors 104 as opposed to the fluid sump 110.

By adjusting how much of the actuating fluid flow provided by the pump 106 goes to the injectors 104 as compared to the sump 110, the pressure of the fluid supplied to the injectors 104 may be regulated.

Figure 2:
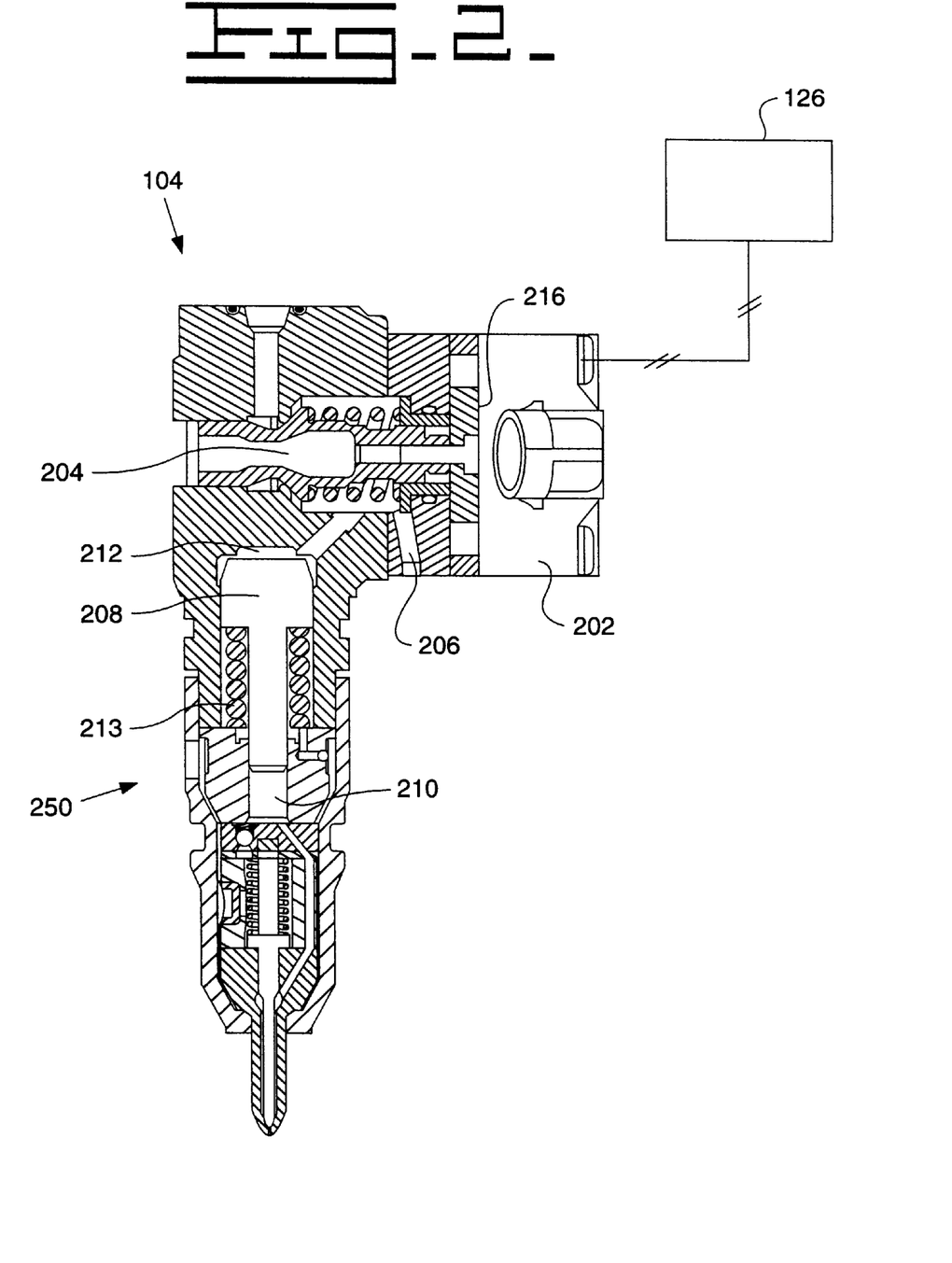
FIG. 2 is an illustration of one embodiment of a fuel injector.

One embodiment of a HEUI injector 104 is illustrated in FIG. 2. High pressure hydraulic actuating fluid is used to control fuel flow in the fuel system 102. The hydraulic fluid is supplied to the injector 104 from the pump 106. The injector 104 includes an injector body 250, a solenoid 202, a poppet valve 204, an actuating fluid inlet 206, a plunger 208, and a plunger cavity 210. When the solenoid 202 is in a de-energized state the poppet valve 204 is in a closed position, preventing actuating fluid to flow into the fluid inlet 206. The solenoid 202 may be energized by receiving an injection command signal from the controller 126. The injection command signal may also be referred to as the start of current signal. When the solenoid 202 is energized the armature 216 is magnetically attracted to the solenoid 202. The poppet valve 204, connected to the armature 216 then moves towards the solenoid 202, opening up the fluid inlet 206 such that the actuating fluid may flow into the injector 104 and exert a downward force onto the plunger 208. When the downward force exceeds the opposing force exerted on the plunger 208 by the plunger spring 218, the plunger 208 will move downwards forcing fuel from the plunger cavity 210 and out the injector 104 through the nozzle 214.

Figure 3:
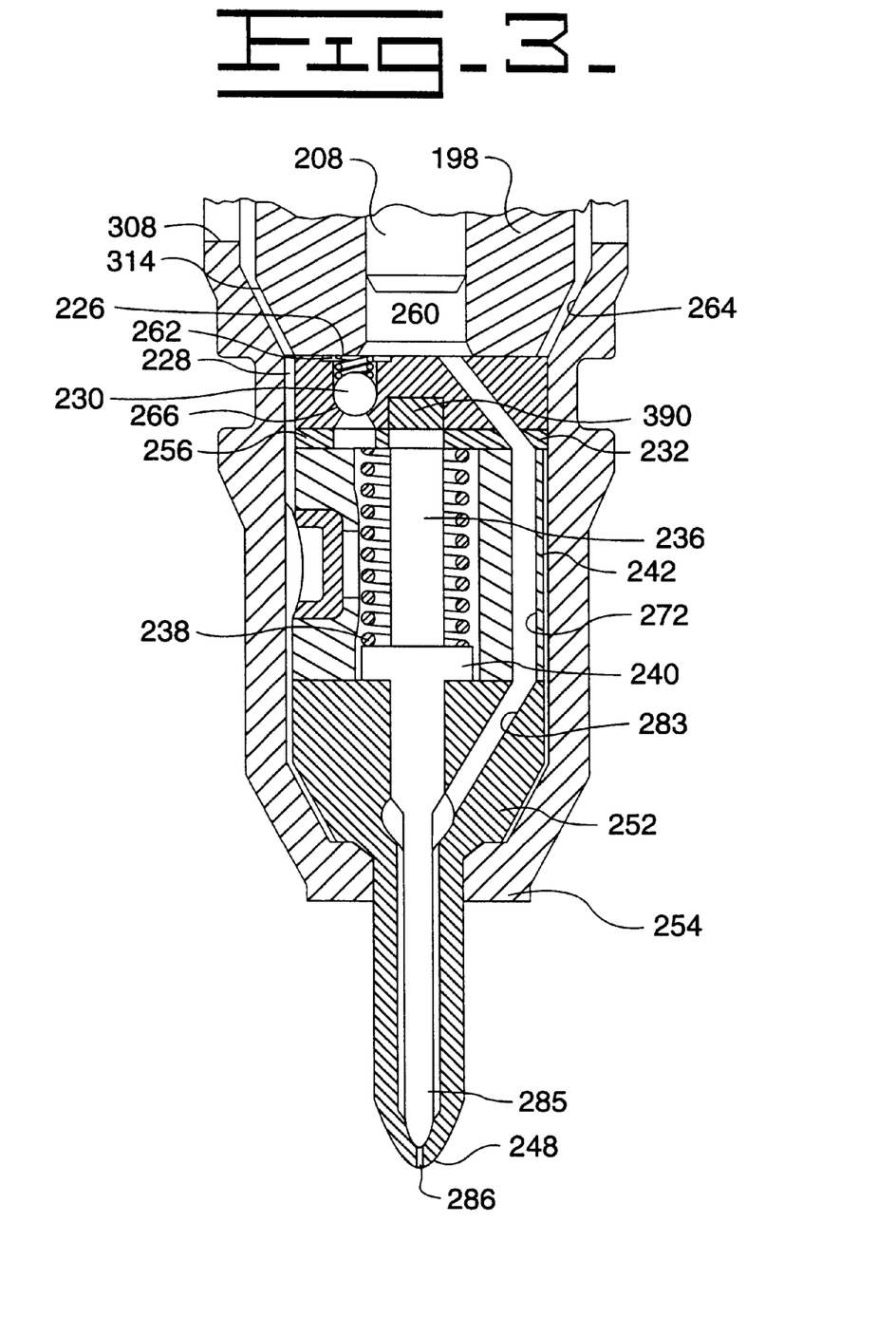
FIG. 3 is an illustration of an expanded view of a lower portion of a fuel injector.

FIG. 3 illustrates an expanded view of the lower portion of one embodiment of the HEUI injector 104. The nozzle and tip assembly 302 is mounted to the injector body 250 and includes a ball spring 226, a ball spacer 228, a one-way flow check valve 230 preferably in the form of a ball check, a stop member 232, a stop pin 236, a needle check spring 238, a lift spacer 240, a sleeve 242, a needle check 248, a needle check tip 252, a case 254, and a needle check spring seat washer 256, and a needle check stop 390.

The stop member 232 is axially positioned between the barrel 198 and the sleeve 242. The stop member 232, barrel 198, and plunger 208 collectively define a plunger cavity, or fuel pump chamber 260. The stop member 232 includes a fuel inlet passage 262 and one or more fuel discharge passages 264. Both the inlet passage 262 and the discharge passage(s) 264 communicate with the fuel pump chamber 260. The inlet passage 262 has an internally-disposed annular seat 266 generally facing the barrel 198. The check valve 230, ball spacer 228, and ball spring 226 are positioned in the inlet passage 262 so that the ball spacer 228 is positioned between the ball spring 226 and the check valve 230, the ball spring 226 is positioned between the barrel 198 and the ball spacer 228, and the check valve 230 is positioned between the ball spacer 229 and the annular seat 266 of the stop member 232. The ball spacer 228 located one end of the ball spring 226 in force exerting relation to the check valve 230 and also functions as a positive stop for upward displacement of the check valve 230 towards the barrel 198. The ball spring 226 is preferably a helical compression spring which normally biases the check valve 230 against the annular seat 266. Alternatively the ball spacer 228 and ball spring 226 may be eliminated from the inlet passage 262 of the stop member 232.

The operation of the fuel injector 104 will now be described. Fuel is supplied at a relatively low pressure (for example, about 276 to 413 kPa or 40 to 60 psi) to the unit injector 104 by the respective fuel manifold (not shown). The fuel flows through the case fuel inlet holes 308 and the annular passage 314. The relatively low pressure fuel unseats the check valve 230 in opposition to the force of the compressed ball spring 226 when the solenoid 202 is in its de-energized state and the pressure in the fuel pump chamber 260 is lower than the pressure upstream of the check valve 230 by a selected amount. While the check valve 230 is unseated, the fuel pump chamber 260 is refilled with fuel.

When the solenoid 202 is energized, the actuating fluid flows through the fluid inlet 206 and comes into contact with the plunger 208. The high pressure actuating fluid displaces the plunger 208 in opposition to the force generated by the compressed plunger spring 218. The fuel trapped in the fuel pump chamber 260 becomes pressurized. This pressurized fuel flows from the fuel pump chamber 260 and through the discharge passages 264, 272, 283, 285 where it acts on a needle check 248 in opposition to a pre-load exerted by a needle check spring 238. The pressurized fuel lifts the needle check 248 after a selected pressure level is reached and the highly pressurized fuel is injected through the injection spray orifices 286.

As the plunger 208 comes down, forcing fuel through the injection spray orifice 286, the pressurized fuel from the fuel chamber 260 is at a higher pressure than the fuel being delivered from the fuel manifold. Therefore the ball spacer 228 is forced into the seat 266, and the check valve 230 is closed.

In order to end injection or control the quantity of fuel injected, the controller 126 discontinues its injection command signal to the solenoid 202. De-energizing the solenoid 202 enables the poppet valve 204 to return to its original position so that no more actuating fluid flows into the injector 104. The fluid within the injector 104 is then de-pressurized and all or a portion of it is exhausted directly back to the sump 110. The plunger 208 then returns to its original position (prior to the solenoid 202 being energized) by the force acting upon it from the plunger spring 218.

In the preferred embodiment, the needle check stop 390, needle check spring seat washer 256, needle check 248, and needle check spring 238 are conductive, and the stop member 232 is non-conductive. In the preferred embodiment, the injector body 250 is inherently grounded. Before injection occurs, the needle check 248 is in electrical contact with the injector body 250 through the needle check tip 252 and case 254, and is therefore grounded. The needle check stop 390 is electrically isolated from the rest of the injector body 250, when before injection occurs. When injection occurs, the needle check 248 moves towards the needle check stop 390 until contact is made via the stop pin 236 and the lift spacer 240. The needle check stop 390 is connected to the controller 126 by an insulated wire 392 that runs through the body 250 of the injector 104. The manner in which the insulated wire 392 is run through the body 250 of the injector 104 is implementation dependent. The implementation is dependent, in part, on the implementation of the injector 104. In one embodiment groves may be formed in parts of the injector 104 enabling the wire 392 to run through the body. In an alternative embodiment, holes may be formed, as needed, in order to extend the wire 392 to the controller 126. In yet another embodiment the wire 392 may be threaded through the injector 104. In addition, all three methods of running the wire 392, i.e., forming grooves, holes, and threading the wire 392, may be used to extend the wire 392 to the controller 126.

Figure 4:
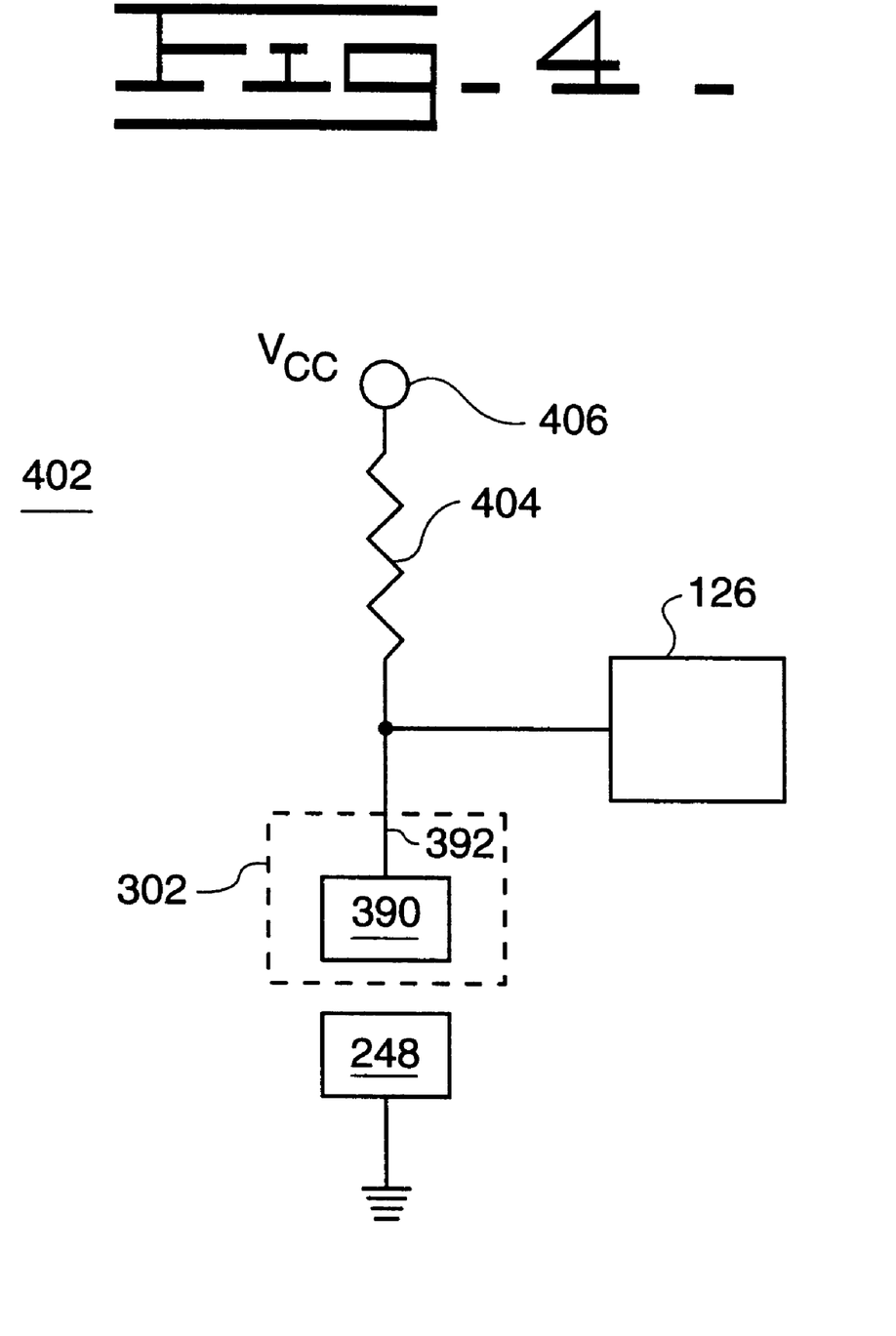
FIG. 4 is an illustration of one embodiment of a schematic of the sensing device.

In the preferred embodiment, the controller 126 is able to detect when the needle check stop 390 is in contact with the needle check 248, via the stop pin 236 and lift spacer 240. For example, a circuit 402, as illustrated in FIG. 4, may be used to determine when the needle check 248 is in electrical contact with the needle check stop 390. A pull up resistor 404 may be connected between the needle check stop 390 and a voltage source 406. A check stop voltage level may be sensed by monitoring the voltage level of the insulated wire 392. In the preferred embodiment, the injector 104 includes a sensing device to sense the position of the needle check 248. In one embodiment, the sensing device 402 includes the needle check stop 248 and the associated insulated wire 392 connecting the check stop 248 to the controller. The sensing device 402 delivers the check stop voltage level to the controller 126, which is indicative of the position of the needle check stop 248.

When injection occurs, i.e., as the plunger 204 forces the fuel out the chamber 260, the needle check 248 is pushed off the needle check tip 286, and is forced against the needle check stop 290 by the pressurized fuel. The needle check stop 290 then becomes grounded through the needle check 248, the needle check spring 238, stop pin 236, and the needle check spring seat washer 256, to the injector body 250. The controller 126 is able to determine the needle check stop 290 is grounded by monitoring the check stop signal.

As the plunger 208 returns to its extended position, the needle check 248 returns to its first position, and contact is broken between the needle check 248 and the needle check stop 390.

The present invention includes a method and apparatus for determining a fuel injection delay of a fuel injector located within an engine. The method includes the steps of generating an injection command signal, and determining the time the command signal was generated. The start of injection is then sensed. In the preferred embodiment, the time the start of injection occurs is determined. The time the injection command was generated is then compared with the start of injection time. A fuel injection delay is then determined in response to the comparison.

Figure 5:
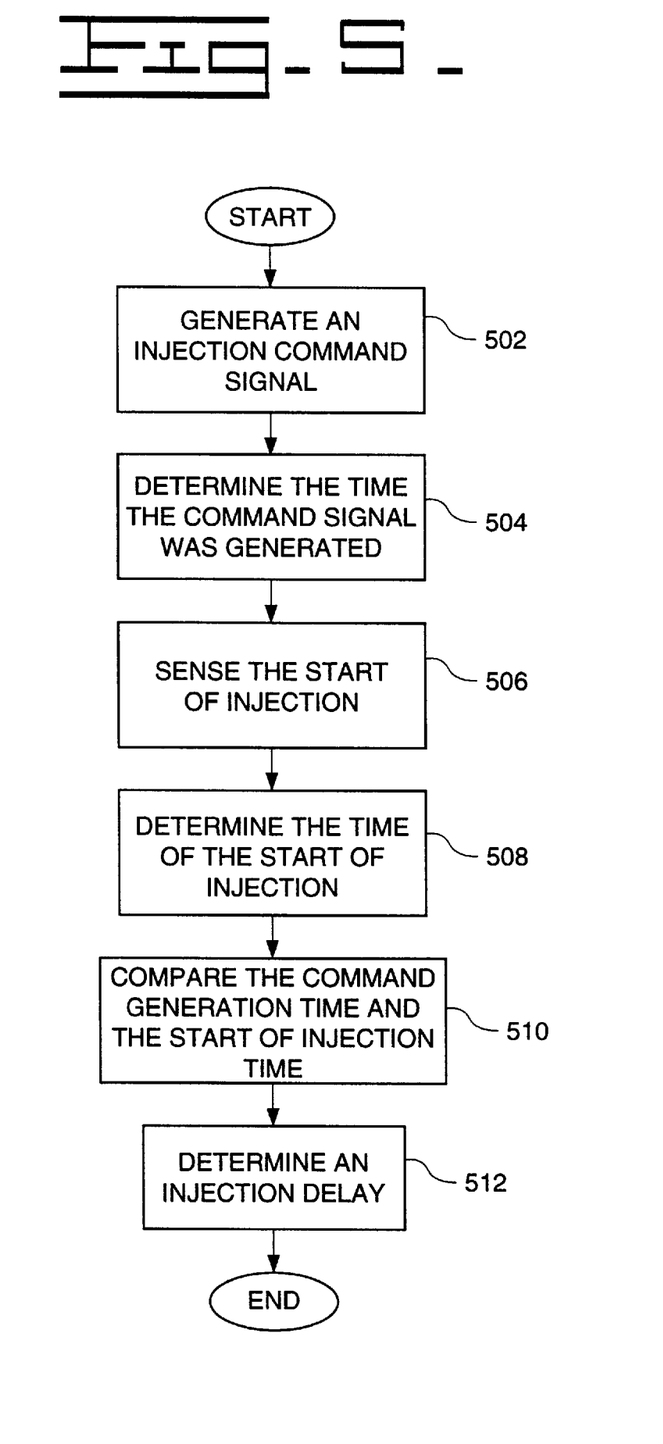
FIG. 5 is an illustration of the method for determining a fuel injection delay of a fuel injector.

FIG. 5 illustrates a flow diagram of the present invention. In a first control block 502 an injection command signal is delivered by the controller 126 to the solenoid 202 of the injector 104. The injection command signal energizes the solenoid 202. That is, prior to receiving the injection command, the solenoid is de-energized. The timing of the injection command is determined by a fuel injection control strategy (not shown), and is based on achieving a desired firing time of the engine cylinder (not shown) associated with the injector 104.

In a second control block 504 the time the injection command signal is generated is determined. In one embodiment, a timer, e.g., a timer, may be started when the injection command is generated by the controller 126.

In a third control block 506 the start of injection is sensed. In the preferred embodiment the start of injection may be determined by sensing the position of the needle check 248. In one embodiment, the position of the needle check 248 may be monitored by monitoring the needle check stop signal. When the signal goes low the needle check 248 has come into contact with the needle check stop 390, via the stop pin 236 and the lift spacer 240, indicating the start of injection. When the check stop voltage level goes from low to high, the needle check 248 is no longer in contact with the needle check stop 390 indicating the end of injection.

The fuel injection delay may be determined in response to the start of injection. In a fourth control block 508, the time of the start of injection is determined. In the preferred embodiment, when the needle check stop signal goes low, indicating the start of injection, the controller stops the timer.

In a fifth control block 510, the time the injection command was generated and delivered to the solenoid 202 is compared with the time the start of injection occurred. In a sixth control block 512, an injection delay is determined in response to the comparison. That is, the comparison may be used to determine an actual fuel injection delay between the time the injection command was generated and the time the start of injection actually occurred. In one embodiment an expected injection delay may be determined. The expected injection delay is indicative of the expected time difference between the injection command and the start of injection. The expected injection delay may be empirically determined based on the grade of oil used as the actuating fluid, and the temperature. Alternatively, a predetermined number may be used as the expected injection delay.

Due to variations in viscosity of the actuating fluid, which may be due to temperature, oil grade, or age of the fluid, the expected injection delay may not be achieved. The difference between the actual injection delay and the expected injection delay may be used to modify the time the injection command is generated. That is, if the actual injection delay is longer than the expected injection delay, the cylinder will fire late. Therefore, an offset based on the difference between the actual and expected injection delay, may be added to the injection timing such that the injection command is delivered to the solenoid 202 sooner. The offset will enable the cylinder to receive the fuel injection at the appropriate time, and fire at the appropriate time, thereby offsetting the difference between the expected and actual injection delay.

Figure 6:
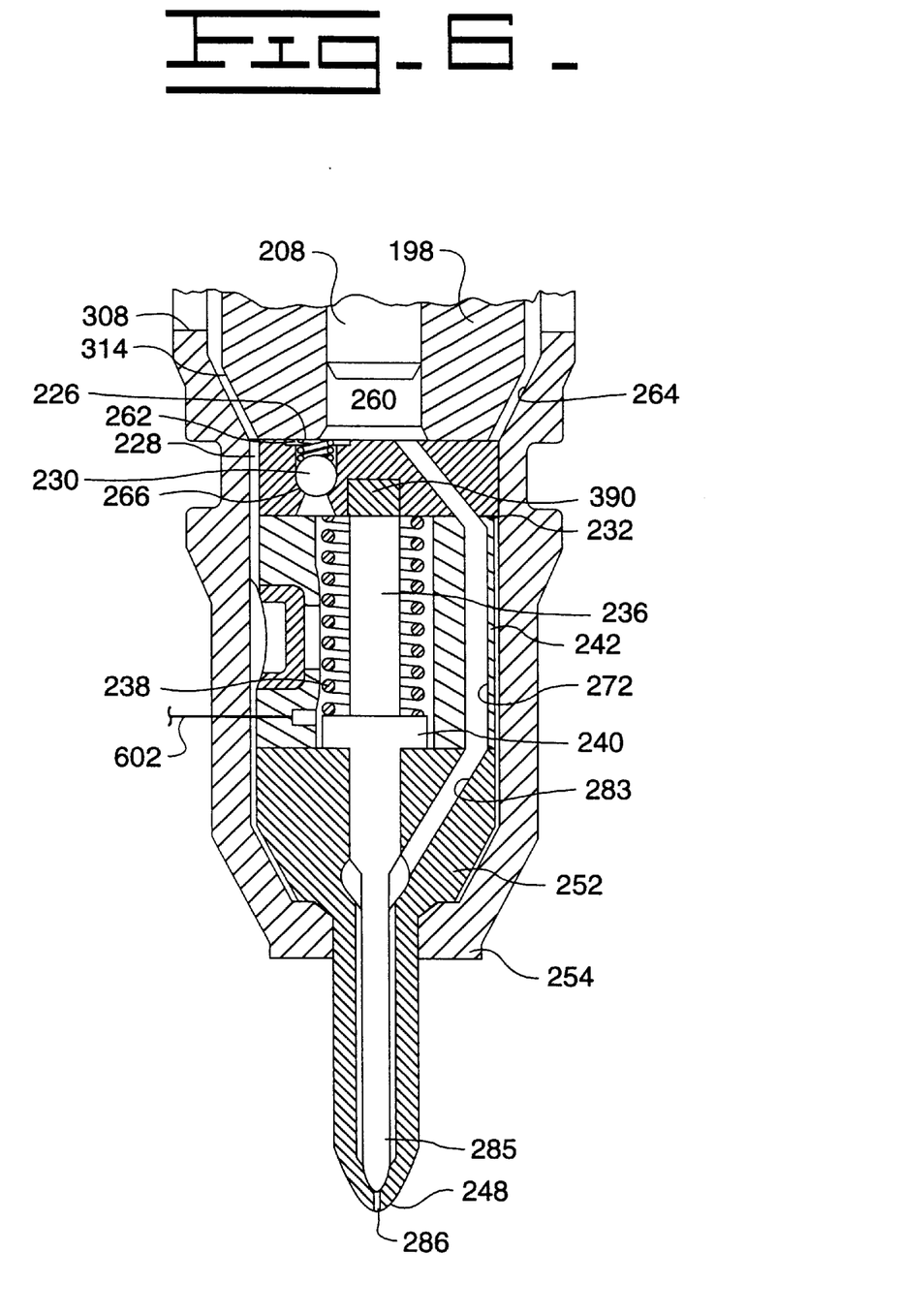
FIG. 6 is an illustration of an expanded view of a lower portion of an alternative embodiment of a fuel injector.

In an alternative embodiment, a sensing device 602 may be used to sense the position of the needle check 248, as illustrated in FIG. 6. In one embodiment, the sensing device 602 is an eddy current sensor that senses the motion of the needle check 248. The eddy current sensor 602 is electrically connected to the controller 126. In one embodiment, the measurement of the motion of the needle check 248 may be empirically measured to determine how much change in position is needed before injection may be determined to have started. That is, an injection threshold may be emperically determined that is indicative of the position change that is needed before injection begins. For example, during the operation of the engine 10, a first position is measured when injection is not occurring, i.e., a resting position. The position of the needle check 248 is continually monitored until a second position exceeds the first position by an injection threshold. The injection threshold may be emperically determined to be indicative of the amount of position change needed from the resting position before injection occurs. If the second position exceeds the first position by the injection threshold, then the start of injection may be determined to have occurred. In one embodiment, the injection threshold may be small in order to filter out vibrations that may occur during the operation of the injector, while responding to any significant motion of the needle check 248 as an indication a start of injection occurred.

Figure 7:
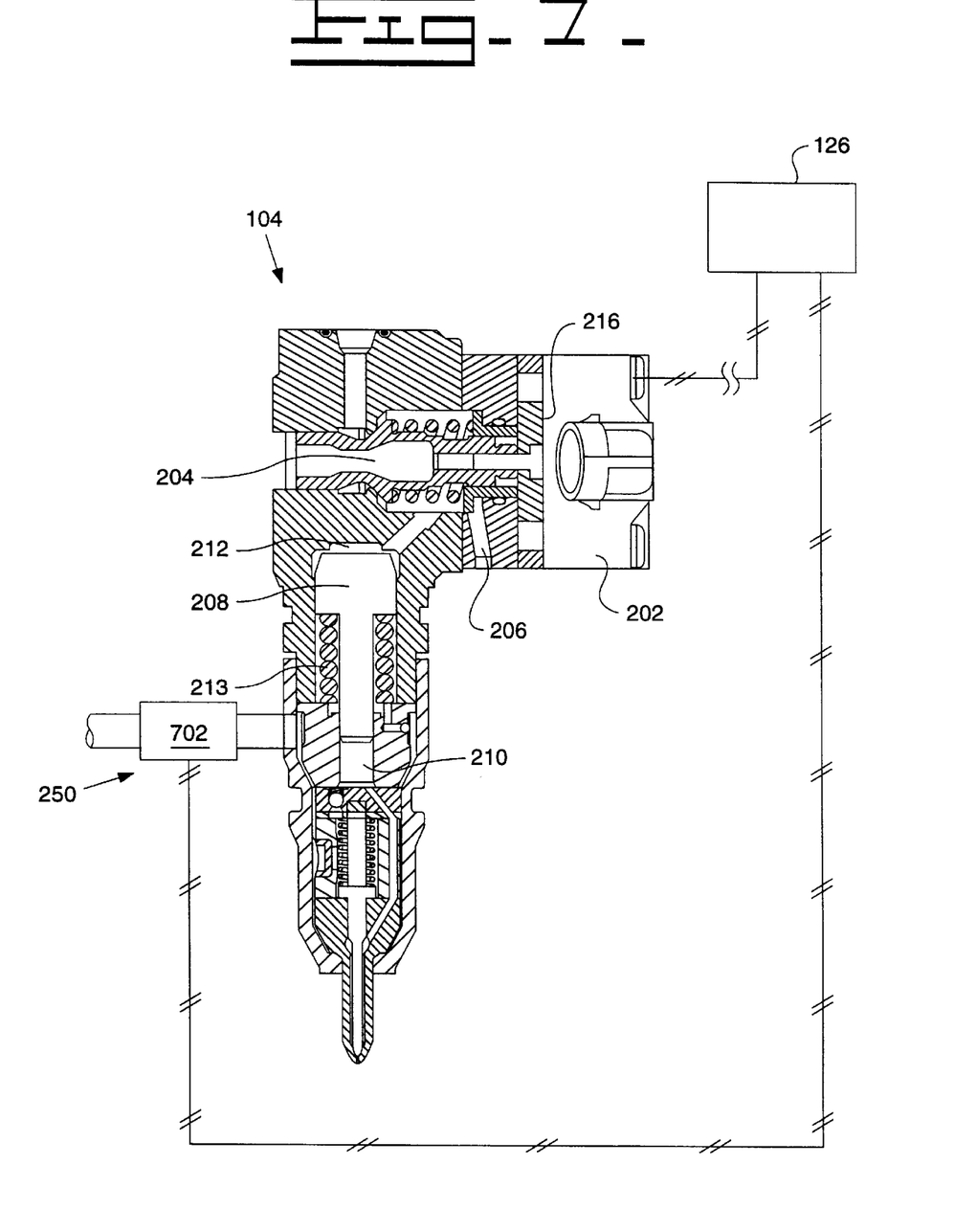
FIG. 7 is an illustration of a flow sensor configured to measure the flow of fuel into the fuel injector.

In yet another alternative, a flow sensor 702 may be used to measure the flow of fuel into the fuel inlet 308 of each injector 104, as illustrated in FIG. 7. The flow sensor 702 is electrically connected to the controller 126. As described above, after injection has occurred, the plunger 208 returns to its resting position, and the relatively low pressure fuel unseats the check valve 230 and flows into the fuel pump chamber 260. During injection, the plunger 208 forces the fuel from the chamber 260 and out the injector 104 through the discharge passages 264, 272, 283, 285. During injection, the pressure of the fuel in the pump chamber 260 is greater than the fuel flowing into the injector 104 through the check valve 230. Therefore the check valve 230 closes preventing fuel to flow into the injector 104. Therefore, the fuel flows into the injector 104 after the end of injection, and stops just prior to the start of injection. Therefore the start of injection may be determined to occur when the fuel flow signal indicates the flow of fuel into the injector has stopped.

INDUSTRIAL APPLICABILITY

The present invention provides a method and apparatus for determining a fuel injection delay of a fuel injector located within an engine, during the operation of the engine. The fuel injector includes a solenoid that is electrically connected to a controller. The invention includes the steps of generating an injection command signal, determining a time of said injection command signal generation, and sensing a start of injection. The start of injection is dynamically sensed during the operation of the engine.

The viscosity of the actuating fluid effects both when fuel is delivered (the injection timing) and amount of fuel delivered by the injector. Improper delivery of fuel can cause problems starting an engine, and operating an engine When the controller 126 determines the injection delay of the fuel by the injector 104, the delay may be accounted for in determining and controlling the operational characteristics of the fuel system, including the desired fuel quantity, desired injection duration, desired injection timing, and desired fluid pressure, thereby improving the overall performance of the fuel system.

One of the advantages of the present invention is that as the viscosity of the fluid changes, e.g., the fluid begins to change characteristics due to use over time or temperature, the present invention will continue to dynamically determine the injection delay. Therefore overall system performance is not adversely effected if oil begins to break down, i.e., become less viscous over time, or the operating temperature of the actuating fluid changes.

Other aspects, objects, and advantages of the present invention can be obtained from a study of the drawings, the disclosure, and the claims.

What is claimed is:

1. A method for determining a fuel injection delay of a fuel injector located within an engine, the fuel injector having a solenoid, the solenoid being electrically connected to a controller, comprising the steps of:

generating an injection command signal;

sensing a fuel flow to said injector;

determining a beginning of said fuel flow corresponds to a end of injection; and determining an end of said fuel flow corresponds to a start of injection.

2. A method, as set forth in claim 1, further comprising the step of determining said fuel injection delay in response to said command signal generation and said determined start of injection.

3. An apparatus configured to determine a fuel injection time of a fuel injector located within an engine, comprising:

a sensing device configured to sense a fuel flow to the injector and responsively generate a fuel flow signal; and a controller configured to receive said fuel flow signal and determine an end of injection in response to said fuel flow signal indicating a beginning of fuel flow to said injector, and determine a start of injection in response to said fuel flow signal indicating an end of fuel flow to said fuel injector.

* * * * *